3,455,976
Patented July 15, 1969

3,455,976
REACTION PRODUCTS OF METAL CHLORIDES AND BORATE ESTERS AND METHOD FOR PRODUCING SAME
Robert C. Wade, Ipswich, Mass., assignor to Ventron Corporation, Beverly, Mass., a corporation of Massachusetts
No Drawing. Continuation-in-part of application Ser. No. 608,250, Jan. 10, 1967. This application Sept. 25, 1967, Ser. No. 670,419
Int. Cl. C07f 5/02, 7/00, 7/28
U.S. Cl. 260—429.3      15 Claims

ABSTRACT OF THE DISCLOSURE

The invention provides products of unknown complex chemical structure having a variety of useful properties e.g. as delustering agents for glass surfaces and polymerization catalysts. These products are produced by reacting one or more substantially anhydrous borate esters, such as trimethyl borate, triethyl borate, tripropyl borate, tributyl borate, trihexyl borate, trihexylene glycol biborate, tri(m, p) cresyl borate, and mixtures thereof with a substantially anhydrous chloride of a metal selected from the group consisting of Ti(IV), Zr(IV), Hf(IV), Sn (IV), Al(III), Fe(III), Mo(V), Nb(V), Ta(V), W(VI), and mixtures thereof in a molar ratio of at least about 0.33 mole of the selected borate ester for each mole of the chloride of the selected metal in an inert substantially anhydrous diluent, such as the selected borate ester, methylene chloride, chloroform, or carbon tetrachloride, at a temperature between room temperature and about 200° C. until the reaction mixture ceases to give off organic chloride. By removing the volatile material from the reaction mixture by evaporation the product of complex chemical structure may be isolated. If desired, before isolating the complex product, the chloride of another metal may be added to the reaction mixture and permitted to react with the complex product until organic chloride ceases to be given off thereby forming a second complex product containing two metals.

---

This invention relates to products of complex chemical structure produced by the reaction of certain borate esters with one or more of several metal chlorides.

This application is a continuation-in-part of my copending application Ser. No. 608,250, filed Jan. 10, 1967. That application describes the preparation of products of unknown complex chemical structure by reacting titanium or zirconium tetrachloride with trimethyl borate in an inert diluent, such as methylene chloride, chloroform, carbon tetrachloride, or an excess of trimethyl borate with good mixing. The reaction is exothermic and the temperature of the reaction mixture rises slightly as the reaction proceeds with methyl chloride being given off. When methyl chloride ceases to be given off the reaction is essentially complete. By removing volatile material, such as the dilutent or excess trimethyl borate and any unreacted reactant by evaporation, a solid product is obtained which varies from a deep yellow color to a tannish white color. This solid product appears to be polymeric in nature. It is amorphous when examined by X-ray diffraction techniques. Elemental analysis of the final product indicates that from 1 to less than 2 moles of trimethyl borate reacts with 1 mole of titanium or zirconium tetrachloride. These complex products contain titanium or zirconium together with boron, carbon, hydrogen, chlorine, and oxygen.

These complex titanium and zirconium products are soluble in water giving acidic solutions. They are also soluble in methylene chloride, chloroform, carbon tetrachloride, acetone, and glycol ethers, such as monomethyl ethylene glycol and dimethyl ethylene glycol ethers. When applied to glass surfaces, such as glass fabrics, and the solvent or water evaporated, delustering occurs and a marked water repellency develops. The water repellency can be enhanced by washing in a 1 percent solution of soap, rinsing and drying.

As shown in my copending application Ser. No. 630,845, filed Apr. 14, 1967, these complex products not only have a high affinity for all types of glass but also for certain compounds containing free hydroxyl groups. Thus, they may be used to bind hydroxylic compounds, such as polyvinyl alcohol, to glass surfaces from aqueous or nonaqueous solutions, the glass having previously been coated with the complex product of titanium or zirconium. When dried the normally water-soluble coating materials are rendered substantially water-insoluble on the surface of the glass. Glass so treated is capable of being dyed with vat dyes or other dyes normally used on cellulose fibers to give full dyeings. Glass so treated can be more easily cemented by adhesives and is protected against abrasion and scratching. Even particulate colloidal materials having free hydroxyl groups, such as partially hydrated colloidal silica, may be bound tightly to glass surfaces with these complex products thereby imparting delustering to glass textile materials.

The present invention is based in part upon the discovery that not only do titanium and zirconium tetrachlorides react with trimethyl borate to form useful products of unknown complex chemical structure but also the chlorides of several other metals react in a similar manner with trimethyl borate to form highly useful reaction products of unknown complex chemical structure. Thus, the present invention contemplates in part the preparation of highly useful products of complex chemical structure which are the reaction products of trimethyl borate with the chloride of a metal selected from the group consisting of Ti(IV), Zr(IV), Hf(IV), Al(III), Fe(III), Mo(V), Nb(V), Sn(IV), Ta(V), W(VI), and mixtures of such chlorides. While I prefer to employ trimethyl borate, it may be replaced by other borate esters, such as triethyl borate, tripropyl borate, tributyl borate, trihexyl borate, trihexylene glycol biborate, tri(m, p)cresyl borate, and mixtures thereof or a mixture of one or more of such borate esters with trimethyl borate.

In forming the products of the invention using trimethyl borate, the substantially anhydrous chloride of the selected metal is mixed with substantially anhydrous trimethyl borate in a molar ratio of at least about 0.33 mole of borate ester for each mole of the chloride of the selected metal, preferably, in a substantially anhydrous inert diluent, such as methylene chloride, chloroform, carbon tetrachloride, or an excess of trimethyl borate. The reactions may be carried out between room temperature and about 120° C. The order of addition of the reagents is not critical. Thus, the metal chloride may be added to the boron ester, or the boron ester may be added to the metal chloride, or both may be added simultaneously to the reaction zone.

In the case of the very reactive combinations of reagents, such as titanium tetrachloride or ferric chloride with trimethyl borate, the reactions start immediately at room temperature and the temperature of the reaction mixture rises slightly with methyl chloride being given off. In the case of less reactive combinations of reagents, it is often necessary to heat the reagents mildly, for example, to the boiling point of methylene chloride (40.1° C.), or trimethyl borate (67–68° C.), or in a few cases to temperatures as high as 90°–120° C. In the case of silicon tetrachloride the reaction is very slow but the rate of reaction may be accelerated by the addition of a minor amount of more reactive metal chloride as a promoter, such as ferric chloride or titanium tetrachloride, etc.

When methyl chloride ceases to be given off the reaction is complete and the desired reaction product may be isolated by evaporation of volatile material, such as the diluent or any excess reagent. This may be accomplished by applying a vacuum to the reaction vessel while gently heating. In some cases, the reaction product is highly soluble in the reaction medium, therefore, stronger heating under vacuum is required to remove the volatile material. In general, temperatures not over 100° C. under a final vacuum of 1–20 mm. of mercury are sufficient to remove the volatile material. Most of the reaction products appear to be polymeric in nature and very complex in chemical structure.

When reacting a mixture of chlorides of selected metals with a borate ester, at least about 0.33 mole of the selected borate is used for each sum of the molar proportions of the chlorides of the selected metals.

When producing a complex product produced by the reaction of the chlorides of at least two selected metals with trimethyl borate, it is often preferable to react one of the metal chlorides with the borate completely as previously described but without isolating the complex reaction product. The chloride of another selected metal in a molar quantity not greater than the molar quantity of the chloride of the first selected metal then may be added to the reaction liquor and be reacted with the previously formed complex reaction product at a temperature between room temperature and about 120° C. After the second reaction has been completed, as indicated when methyl chloride ceases to be given off, volatile material is removed by evaporation to isolate the second complex reaction product. This method is particularly advantageous when it is desired to react a very reactive metal chloride, such as titanium tetrachloride or ferric chloride, and a less reactive metal chloride, such as $SiCl_4$, with trimethyl borate.

The method for reacting the chlorides of the previously mentioned group of metals with other borate esters, such as trimethyl borate, tripropyl borate, tributyl borate, trihexyl borate, trihexylene glycol biborate, tri(m,p)cresyl borate, and mixtures thereof or a mixture of one or more of such borates with trimethyl borate is similar to that described for the reaction with trimethyl borate. With these borate esters, however, the reactions are, in general, considerably slower and temperatures up to about 200° C. may be used to obtain reasonable reaction rates. Since the boiling points of the organic chloride by-products are considerably higher than methyl chloride, they must be distilled or evaporated from the reaction product by heating the reaction mixture either at atmospheric or reduced pressure.

The complex reaction products of the invention have very unusual and unique properties. As previously pointed out, the use of the complex products produced by the reaction of titanium or zirconium tetrachloride with trimethyl borate give valuable properties to glass articles, such as delustering the surface or to produce water repellency on the surface or to render these surfaces dyeable with textile dyes or as components in applying scratch and abrasion resistant finishes to glass containers. The reaction product produced by reacting hafnium tetrachloride with trimethyl borate has similar properties and uses. It has been discovered that many of the other reaction products have equally valuable properties in treating glass surfaces as well as having applications in other areas. Thus, the complex reaction product produced by reacting ferric chloride with trimethyl borate, when applied as a solution and dried, will produce a light golden yellow, permanent, water repellent mineral dyeing on glass, cotton, and cotton-polyester fabrics.

The complex reaction products containing Ti(IV) or Zr(IV), when used in combination with aluminum alkyls, are reduced and provide active catalysts for the polymerization of olefins such as ethylene.

The complex reaction product of $AlCl_3$ and trimethyl borate can be used from water solutions to develop excellent water repellent finishes or many textile fabrics, especially cellulosics. It also exhibits good dye fixing properties for direct dyes on cellulose fabrics. This complex product also shows excellent activity as an antiperspirant, deodorant and bacteriocide in cosmetic applications.

The complex reaction product of tin tetrachloride and trimethyl borate exhibits useful properties as heat stabilizers for plastics, such as polyvinyl chloride, and as bacteriocides and fungicides.

The complex reaction product of cuprous chloride and trimethyl borate shows fungicidal activity and antifouling properties when used in treating materials exposed to marine growth.

The comple reaction product of molybdenum pentachloride and trimethyl borate is soluable in water, is substantive to glass and cellulosic surfaces, and when applied to these materials followed by application of a soap solution develops excellent water repellent finishes. This product also is reactive at room temperature with aromatic and olefinic hydrocarbons to form highly colored complexes. With methylated benzene compounds, such as toluene and xylene, intense blue or greenish blue pigments are formed. With benzene a deep yellow brown colored precipitate is formed; with chlorobenzene a muddy brown colored precipitate forms; and with styrene a brown colored precipitate forms. Warming styrene gently with a small amount of this complex reaction product causes vigorous polymerization of the styrene. Warming this complex product with perchloroethylene slowly developed a blue green color. Warming it with heptene formed a dark yellow brown colored precipitate. Thus, this reaction product can be used as a sensitive spot test for unsaturated and aromatic hydrocarbons and is especially useful to detect methylated aromatic hydrocarbons. This reaction product is a strong Friedel-Crafts catalyst.

The complex reaction product of silicon tetrachloride and trimethyl borate reacts with metal alkyls such as aluminum alkyls to form new and useful products which may be used in the preparation of new polymers similar to the silicones.

The complex reaction products of niobium pentachloride and trimethyl borate and of tantalum pentachloride with trimethyl borate are not appreciably soluble in water but are slightly soluble in dilute (2%) sodium hydroxide solutions. These alkaline solutions may be used to coat glass surfaces, and when followed by treatment with an aqueous soap solution, water repellency is imparted to the glass surface. The tantalum reaction product fluoresces a bright peach color under "black light" ultraviolet radiation. Thus, the latter product is useful in decorative compositions of plastics and paints to produce this peach color in "black light."

The complex product obtained from the reaction of $WCl_6$ and trimethyl borate is photochromic, being a deep blue when exposed to visible light and yellowish white in the dark. It is also an active catalyst for polymerizing monomers, such as styrene.

The complex products prepared with trimethyl borate still contain unreacted chlorine atoms. The halogens are still reactive toward many organic groups which contain a reactive hydrogen atom, such as amino, hydroxyl, or carboxyl groups. The reaction products of $TiCl_4$, $ZrCl_4$, $SiCl_4$, $FeCl_3$, $TaCl_5$, $NbCl_5$, and $SnCl_4$ with trimethyl borate in particular react vigorously with alkyl or aryl amines; with polyamines; with alcohols; and with carboxylic acids and their salts to product derivatives of enhanced properties for a wide variety of applications. Thus, these complex products may be reacted, for example, with lauryl amine to give new products which have high surface activity in water and which contain both the parent metal atom and boron.

The complex reaction products prepared by reacting the chlorides of the group of metals previously mentioned herein with borate esters, such as triethyl borate, tripropyl borate, tributyl borate, trihexyl borate, trihexylene glycol biborate, and tri(m,p)cresyl borate also contain unreacted chlorine atoms. These halogens are still reactive toward many organic groups which contain a reactive hydrogen atom and react therewith similar to the reaction products made with trimethyl borate. In general, the properties of these complex reaction products are similar to those prepared with corresponding metal chlorides and trimethyl borate.

The compositions of the complex reaction products of the borate esters appear to vary with the molar ratios of borate ester to metal chloride as indicated by the amount of by-product organic chloride given off. The properties of the complex reaction products described herein are the properties possessed by products obtained by reacting the metal chlorides with the maximum amounts of borate esters which in turn varies with the metal chloride and borate ester used.

In addition to the inert diluents previously mentioned these complex reactions may also be carried out in aliphatic hydrocarbons, such as petroleum ether, hexane, heptane, octane, and cyclohexane. However, the reactions proceed much more slowly in these diluents and, therefore, are not preferred.

The invention is illustrated further by the following specific examples.

Example 1

A 500 ml., three-neck flask was fitted with a water-cooled reflux condenser which, in turn, was connected to a Dry Ice-acetone cooled condenser and trap; a thermometer and dropping funnel were also fitted to the reaction flask. Stirring was accomplished with a magnetic stirrer.

To the flask was charged 200 g. of redistilled methylene chloride and 69 g. (0.66 mole) of $B(OCH_3)_3$. To the dropping funnel was charged 56.7 g. (0.33 mole) of $TiCl_4$. The $TiCl_4$ was added to the flask over a period of 5 minutes with the formation of bright yellow solids. The temperature rose from 22 to 45° C. spontaneously. Then, after 10 minutes of stirring, $CH_3Cl$ started to evolve along with a small amount of unidentified volatile material which fumed in moist air and gave a positive test for boron. This probably was a methoxy boron chloride.

After about 40 minutes, the evolution of volatiles ceased and the reaction was essentially complete. The yellow solids had darkened and mostly dissolved.

Methylene chloride was removed by evaporation under vacuum. As the methylene chloride was removed, the product which came out appeared to be polymeric, went through a very viscous liquid phase, than a taffy-like semi-solid stage, and finally hardened into a glassy solid. This could easily be broken up into a light yellow powder. Recovery of solids was 77 g. About 25 g. of volatile products consisting mainly of $CH_3Cl$, as identified by infrared spectrographic techniques, were recovered.

Elemental analysis of the product showed Ti=18.5%, B=6.8%, C=18.6%, H=3.8%, Cl=25.7%, Ti/B ratio=1/1.6.

Example 2

In this example, no solvent other than a large excess of methyl borate was used. Thus, 145.5 g. of methyl borate was placed in the reaction flask and 55.0 g. $TiCl_4$ (0.32 mole) was added over a period of 10 minutes. Yellow solids formed with the first drop of $TiCl_4$ added and the temperature rose from 22 to 44° C. The low-boiling $CH_3Cl$ started to evolve before the last of the $TiCl_4$ was added in this experiment, but continued to evolve for about 30 minutes after all the $TiCl_4$ was added. The reaction was complete by heating with an electric heating mantle until methyl borate refluxed in the water condenser and no more volatiles were collected in the Dry Ice condenser and trap. Methyl borate was removed by evaporation under a vacuum. Recovery of 83 g. of solids and 29 g. of volatiles was obtained.

The elemental analysis of the solids showed Ti=18.5%, B=5.8%, C=20.0%, H=4.1%, Cl=26.6%, Ti/B ratio=1/1.4.

Example 3

Using the same apparatus described in Example 1, the following experiment was carried out using $ZrCl_4$ in place of $TiCl_4$.

To the reaction flask was charged 200 g. of dry $CH_2Cl_2$ and 62.5 g. or 0.27 mole of $ZrCl_4$. This slurry was stirred with a magnetic stirrer. Then from a dropping funnel was added 104 g. or 1 mole of pure methyl borate. With the initial addition of methyl borate, heat was evolved and when about half of the methyl borate had been added, the temperature had increased from 24° C. to 38° C. After about half of the methyl borate was added, methyl chloride started to evolve and was condensed out in the Dry Ice condenser. After all of the methyl borate was added, the reaction mixture was refluxed for 30 minutes to complete the reaction. Then the methylene chloride and excess methyl borate were distilled off and the remaining liquids removed by heating under vacuum overnight. There was recovered about 96 g. of white solids. Elemental analysis of this product showed Zr=25.6%, B=4.7%, C=17.1%, H=4.0%, Cl=31.0%. The low-boiling material collected in the Dry Ice trap was identified mainly as methyl chloride by infrared spectrographic analysis.

Example 4

One gram of the solid product obtained in Example 2 was dissolved in 100 g. of methylene chloride. A piece of glass fabric which had been heat cleaned at 500–700° F. to remove all foreign material was moistened by exposing to steam, then dipped in the methylene chloride solution, and ironed dry. Marked delustering occurred and excellent water repellency developed. The cloth was washed in water and again ironed dry. No change in the finish was noted.

Example 5

One gram of the product obtained in Example 1 was dissolved in 100 g. of water. A piece of heat-cleaned glass fabric was dipped into this solution, squeezed through a pair of washing machine rolls, and allowed to dry. When dry, marked water repellency had developed when compared with the original untreated fabric. A drop of 30% hydrogen peroxide was placed on the surface of the fabric and an intense yellow color developed. This is characteristic of titanium peroxide and demonstrates that the compound was substantive to the surface of the glass. The treated fabric was then washed for a few second in a 1% solution of soap (Na-stearate-oleate). The fabric was rinsed and ironed dry. Excellent water repellency was now obtained and the glass fabric still gave a positive test for Ti when treated with hydrogen peroxide.

This shows that the new compositions of my inventions are useful for treating glass surfaces to develop water repellency and may be applied from aqueous or non-aqueous media.

Example 6

81 grams (0.5 mole) of anhydrous ferric chloride and 200 g. of methylene chloride was placed in a stirred reaction flask which was fitted with an addition funnel, thermometer and reflux condenser. The reflux condenser in turn was connected to an empty safety trap, then to a water scrubber, and then to a gas meter. The entire system was closed, up to the gas meter. 104 grams (1 mole) of anhydrous trimethyl borate were added from the addition funnel to the stirred reaction flask over a period of 50 minutes. The temperature rose spontaneously from 22° C. to about 34° C. over the course of the reaction. Methyl chloride evolved all during the course of the addition of the methyl borate. When all of the methyl borate was added, the reaction mixture was heated further to about 45° C. for an additional 40 minutes; a total of about 11.6 liters (about 0.5 mole) of $CH_3Cl$ (B.P. 24.2° C.) was evolved during this reaction.

When the reaction ceased, most of the methylene chloride was removed by distillation at atmospheric pressure. The remaining liquids were removed by applying a vacuum to the reaction flask and warming the flask. There remained in the flask 116 g. of golden brown free-flowing powder. A 1% aqueous solution of this powder was clear, reddish-brown in color, with a pH of 2.5.

Elemental analysis of the product showed Fe, 25.8%; B, 6.0%; Cl, 25.5%; C, 19%; H, 3.2%; O (by difference), 20.5%.

Example 7

In the same equipment described in Example 6, 134 g. (1 mole) of powdered, anhydrous $AlCl_3$ was suspended in 400 g. of methylene chloride. To this stirred mass was added 208 g. (2 moles) of methyl borate at a controlled rate. The temperature of the reaction mixture increased spontaneously from 21° C. to about 38° C. As the reaction progressed, the initial undissolved $AlCl_3$ dissolved. When about 1 mole of methyl borate had reacted with 1 mole of $AlCl_3$, giving off 1 mole of $CH_3Cl$, the reaction mixture became a thick pasty mass. As this reaction mass was heated to 40–45° C. with a heating mantle, more $CH_3Cl$ was evolved and the reaction mass quickly thinned out to an easily-stirred slurry. When the reaction was complete, about two moles of $CH_3Cl$ had been evolved. There was recovered about 210 g. of tannish white solids which were very soluble in water without precipitation. The pH of a 1% solution in water was about 4.0. It appears that two moles of methyl borate react with one mole of $AlCl_3$ under these experimental conditions.

Elemental analysis showed Al=11.2%; Cl=24.4%; B=7.0%; C=20.2%; H=4.8%; O (by difference)= 32.4%.

Example 8

91 grams (0.33 mole) of anhydrous $MoCl_5$ suspended in 200 g. of methylene chloride was reacted with 104 grams (1 mole) of anhydrous methyl borate in the same equipment described in Example 6. The methyl borate was added at a controlled rate to the $MoCl_5$ suspension at room temperature. The temperature rose from 23° C. to about 31° C. The reaction was completed by heating the reaction mixture to about 40° C. until about 0.67 mole of $CH_3Cl$ had been evolved. The product was recovered by evaporating off methylene chloride and unreacted methyl borate. There was recovered 120 g. of reddish-brown solids which were easily soluble in water. The solids softened and melted between 60–70° C. It appears that two moles of methyl borate react with one mole of $MoCl_5$.

Elemental analysis shows Mo=26.1%; Cl=21.5%; B=5:8%; C=15.8%; H=2.9%; O (by difference)= 27.9%.

Example 9

In an experiment similar to that described in Example 8, 67.5 g. (0.25 mole) of anhydrous $NbCl_5$ dissolved and suspended in 200 g. of methylene chloride was reacted with 104 grams (1 mole) of methyl borate. The reaction was very exothermic and about ¾ mole of methyl chloride was given off.

The final product was very soluble in the methylene chloride and appeared to be polymeric. Final recovery was 82 g. of tannish white solids.

Elemental analysis showed Nb=29.0%; Cl=16.8%; B=6.5%; C=14.7%; H=3.0%; O (by difference)= 30.0%.

Example 10

In an experiment similar to that described in Examples 8 and 9, 90 g. of anhydrous $TaCl_5$ (0.25 mole) was reacted with 104 g. (1 mole) methyl borate. The reaction was exothermic and methyl chloride came off instantly upon addition of methyl borate. Slightly less than ¾ mole of evolved $CH_3Cl$ was measured during this reaction. 113 g. of light tan-colored solids were recovered.

Elemental analysis showed Ta=46.4%; Cl=14.7%; B=4.9%; C=11.2%; H=2.3%; O (by difference)= 20.5%.

Example 11

The reaction of 100 g. (0.25 mole) of anhydrous $WCl_6$ suspended in 200 g. of methylene chloride with 104 g. (1 mole) of methyl borate was carried out as in previously described experiments. The reaction was vigorous. The original dark-red suspension of finely divided solids became very curdy and changed in color to orange and then yellow as the reaction progressed. The completely reacted solids were a light-greenish yellow in color. Slightly less than 1 mole of $CH_3Cl$ came off during the course of the reaction. The final dried product was a very light blue powder which weighed 106.5 g. These solids were less than 1% soluble in water. Upon standing in a closed glass jar, the color on the top surface and around glass surfaces became an intense blue color. Powder in the interior of the mass was a light yellow color. When the powder was stored in the dark, the intense blue color faded and changed more towards the yellow color indicating that this material is photochromic. When re-exposed to sunlight the intense blue color reappeared.

Elemental analysis showed W=37.5%; Cl=16.5%; B=5.3%; C=10.1%; H=2.2%; O (by difference)= 29.4%.

Example 12

25 grams (0.125 mole) of anhydrous cuprous chloride ($Cu_2Cl_2$) was added to 100 g. of methyl borate. The suspension was refluxed for 18 hours. About 0.13 mole of $CH_3Cl$ evolved. The final product was a pale green powder. In this experiment 1 mole of methyl borate slowly reacts with one mole of $CuCl_2$.

Elemental analysis shows Cu=55.9%; Cl=25.0%; B=1.3%; C=5.9%; H=0.55%; O (by difference)= 11.3%.

Example 13

In this experiment, 65 g. (0.25 mole) $SnCl_4$ was added to 200 g. of methyl borate over a period of 15 minutes at a reaction temperature of 67–71° C. After refluxing for about 35 minutes, the reaction started and methyl chloride started to be given off. As the reaction proceeded, white solids began to form; when about ½ mole $CH_3Cl$ had given off, the solids started to redissolve. A total of about 1 mole of $CH_3Cl$ evolved over a period of about 5 hours. The excess methyl borate was removed by heating under vacuum. 136 grams of a dark-brown low-melting glassy solid was recovered. In this experiment most of chlorine atoms on the tin tetrachloride reacted with the methyl borate to form methyl chloride.

Elemental analysis showed Sn=18.6%; Cl=14.9%; B=11.1%; C=16.2%; H=4.0%; O (by difference)= 35.2%.

Example 14

In this experiment 130 g. of anhydrous $SnCl_4$ (0.5 mole) was added to 104 g. of $B(OCH_3)_3$ at 68° C. Little or no reaction occurred for 90 minutes; then suddenly the entire mass started to react, rapidly evolving $CH_3Cl$ and solidifying. The reaction was complete in less than 15 minutes. The final product was a tannish-white sticky solid which weighed 165 g. Analysis of the final product showed a tin to boron ratio of 1 to 2.5. It was obvious that some methyl borate was lost during the vigorous part of this reaction and an insufficient amount was available at end of reaction to give the desired tin tetrachloride reaction product.

This example and Example 13 show that with tin tetrachloride, a variable number of all the halogen atoms may react with the boron ester depending upon the conditions used in the experiment and the ratio of the moles of boron ester per mole of tin halide used.

Example 15

In this experiment 47 g. of titanium tetrachloride (0.125 mole) was quickly added to a mixture of 36.5 g. (¼ mole) of triethyl borate and 200 g. of methylene chloride. The temperature rose spontaneously from 25° C. to about 32° C. Ethyl chloride (B.P. 12° C.) was slowly evolved. The methylene chloride was distilled off and the reaction vessel temperature increased to 118° C. About 0.125 mole of ethyl chloride was evolved when the reaction was complete. White solids formed on the walls of the flask during the reaction. When the product was finally dried under vacuum it was a brown color. It dissolved in water to give a yellow solution. One mole of ethyl borate appears to react with 1 mole of titanium tetrachloride under the conditions of this experiment.

In similar experiments, the following metal chlorides were found to react with triethyl borate: $AlCl_3$, $ZrCl_4$, $HfCl_4$, $FeCl_3$, $SnCl_4$, $MoCl_5$, $TaCl_5$, $NbCl_5$, $WCl_6$, $Cu_2Cl_2$.

Example 16

In this experiment 156 g. (1.5 moles) of methyl borate was reacted with a mixture of 47.5 g. (0.25 mole) $TiCl_4$ and 33.5 g. (0.25 mole) $AlCl_3$, dissolved and suspended in 200 g. of methylene chloride. An exothermic reaction occurred with the immediate evolution of methyl chloride. The reaction mixture was heated and methylene chloride distilled off. The final reaction temperature was 60° C. A total of about 0.8 mole of $CH_3Cl$ was given off. 109 g. of light grey solids were recovered. The solids were practically insoluble in water, in contrast with the high solubility of the reaction products of titanium tetrachloride or aluminum trichloride with methyl borate.

Elemental analysis showed Ti=11.8%, Al=3.52%, Cl=21.0%, B=7.7%, C=17.2%, H=3.4%, O (by difference)=35.4%.

Example 17

95 g. of $TiCl_4$ (0.5 mole) was added to 104 g. (1 mole) of methyl borate in 200 g. methylene chloride. When the reaction was complete, as evidenced by no more $CH_3Cl$ being evolved, 37 g. of diethylamine (0.5 mole) was added to the solution. Considerable heat was evolved from this reaction, the temperature rising spontaneously from 24° C. to about 45° C. When about ⅔ of the amine had been added, a precipitate or insoluble phase developed and the color changed to an opaque brown color. When the reaction was complete and the solvent removed, there was recovered 131 g. of dark brown solid material which was water soluble.

Example 18

In an experiment similar to that described in Example 17, 95 g. of $TiCl_4$ (0.5 mole) was reacted with 104 g. (1 mole) of methyl borate in 200 g. of methylene chloride. About 0.7 mole of $CH_3Cl$ was evolved. Then 100 g. of primary N-coco amine (a mixed fatty amine derived from coconut fatty acids) was diluted with 50 g. of methylene chloride and was added to the solution. A very exothermic reaction occurred. The temperature rose from 25° C. to about 44° C. The methylene chloride was distilled off, and the last traces removed under vacuum. There was recovered 208 g. of orange waxy solid product which was soluble in water and exhibited very high surface activity in water solution as is seen by its detergency and ability to wet normally hydrophobic surfaces such as polyethylene. A 1% aqueous solution easily emulsifies an equal part of mineral oil.

Example 19

An experiment similar to those described in Examples 17 and 18 was carried out wherein 55 g. of $TiCl_4$ (0.33 mole) was reacted with 69 g. of methyl borate (0.66 mole) in methylene chloride. At the completion of this reaction, 50 g. of triethanolamine (0.33 mole) was added. A very exothermic reaction occurred. The final product was 124 g. of off-white powder which contained Ti, 11.6%; B, 2.96%; Cl, 23.4%; C, 26%; H, 5.6% and N, 3.4%. Oxygen by difference was 27%.

This product was soluble in water and was very substantive to glass surfaces.

Example 20

The product made by the reaction of aluminum chloride and methyl borate as described in Example 7 was used in this experiment. A 1% aqueous solution of this product was prepared. The following fabrics were dipped into this solution, squeezed to about 100% pickup and ironed dry. They were then examined for water repellency.

Glass fabric—excellent water repellency.
65% polyester, 35% cotton—excellent water repellency.
Cotton—poor water repellency.
Cotton treated with 1% solution of this product followed by dipping in 1% soap solution, squeezing and drying gave excellent water repellency.

Samples of rayon fabric which had been dyed with a direct red dye were treated by dipping them in a 1% aqueous solution of this product, squeezing to about 100% pickup and then curing for 5 minutes at 120° C. The treated samples of untreated dyed fabric were then soaped in a ½% soap solution at 150° F. for 30 minutes. Far more dye was retained by the treated fabric than by the untreated fabric. This shows that this compound has valuable dye fixing properties.

Example 21

As in previously described experiments, one mole (104 g.) of methyl borate was reacted with ½ mole (95 g.) of titanium tetrachloride in methylene chloride. About 20 liters of methyl chloride was evolved and measured by means of a wet test meter. The reaction was complete when no more methyl chloride came off and a clear amber colored solution was obtained. Then ½ mole (59 g.) of succinic acid was added to the reaction mixture in four equal increments of about 15 grams each. Copious quantities of gaseous HCl were evolved from the reaction mixture after each addition of succinic acid. This was collected in a scrubber containing 1 N NaOH. After the last of the succinic acid had reacted, about 15 g. of HCl had been caught in the NaOH scrubber. Succinic acid is substantially insoluble in methylene chloride. However, as it reacted with the reaction product of titanium tetrachloride-methyl borate, everything dissolved in methylene chloride. As each portion of succinic acid was added as a solid, it reacted and dissolved, the solution becoming increasingly viscous. This portion of the reaction was carried out at about 40–45° C. over a period of about 8 hours. When completed, methylene chloride was removed by vacuum evaporation. There remained a light tan colored solid product which appeared to be polymeric and soluble in water.

The product showed marked substantivity to glass surfaces and is useful in coatings to improve the dye receptivity of glass fabrics.

Example 22

In an experiment similar to that described in Example 7, ½ mole of anhydrous $AlCl_3$ was reacted with 1.1 mole of trimethyl borate in methylene chloride. About 0.7 mole of $CH_3Cl$ was given off. Then 100 g. (0.5 mole) of primary N-coco amine (a mixed fatty amine derived from coconut oil fatty acids) dissolved in 50 g. methylene chloride was added dropwise to the reaction mass. Heat was evolved as the reaction proceeded. When the reaction was completed and the solvents removed, there remained 200 g. of waxy tan solids which were soluble in water and which showed marked detergency, readily emulsifying mineral oil in water, and high surface activity. A 1% aqueous solution readily wets polyethylene which is normally hydrophobic.

Example 23

An attempt was made to react 0.25 mole of silicon tetrachloride with 0.5 mole methyl borate by refluxing this mixture for several hours. No reaction was apparent. Then 0.5 g. of $FeCl_3$ was added to the reaction mixture. Methyl chloride was slowly evolved. The reaction mixture at first was greenish yellow and slowly turned a greenish black. Over a period of about 48 hours, a total of about 5 liters of methyl chloride was evolved. From this reaction was recovered about 20 grams of black solids which were substantially insoluble in water, burned with a green flame and which were non-crystalline when examined by X-rays.

The product was slightly soluble in warm 2% NaOH but left a light brown floccy precipitate. Elemental analysis showed Si=13.6%, B=11.1%, Cl=4.0%, C=11.0%, H=2.8%, Fe=3.3%, O (by difference)=54.2%.

Example 24

In this experiment 37 grams of trihexylene glycol biborate was dissolved in 100 grams of methylene chloride. To this stirred mixture was added 19 grams (0.1 mole) of $TiCl_4$. An immediate reaction occurred with the evolution of considerable amount of heat. The temperature rose about 11° C. The reaction mixture turned a dark blood red color. The reaction liquor was heated under vacuum to remove methylene chloride and hexylene dichloride. There remained 28 grams of reddish brown solids which appeared to be polymeric and slightly soluble in water. These solids gave a positive test for boron (green flame) and titanium (yellow color with $H_2O_2$).

Example 25

Seven grams of $AlCl_3$ (1/20 mole) was suspended in 100 g. $CCl_4$. To this stirred mixture was quickly added 20 g. of tri n-propyl borate (1/10 mole). The temperature quickly increased about 12° C., and the reaction product became soluble to give a greenish brown solution. The reaction mixture was heated to 80° C. and then the residual liquors were removed by distillation and heating under vacuum. The final product was a tan-white solid which burned when ignited with a bright green flame. The product was appreciably soluble in water.

Example 26

Twenty grams of tripropyl borate was dissolved in 100 g. of carbon tetrachloride. To this was added with stirring 9.5 g. (1/20 mole) of $TiCl_4$. The temperature increased about 10° C. A yellowish red solution was obtained. No precipitate formed. The reaction mixture was distilled and about 3–4 grams of $C_3H_7Cl$ was removed indicating that about one mole of propyl borate reacts with 1 mole of $TiCl_4$. About 11 g. of white solids were recovered from this experiment when all of the reaction liquor had been removed by heating under vacuum. The product was slightly soluble in water to give an acidic solution.

In similar experiments, the following metal chlorides were found to react with tripropyl, tributyl and trihexyl borates: $AlCl_3$, $ZrCl_4$, $FeCl_3$, $SnCl_4$, $MoCl_5$, $TaCl_5$, $NbCl_5$, $WCl_6$ and $Cu_2Cl_2$.

Example 27

In this experiment, 200 grams of carbon tetrachloride were used as the reaction medium. 104 grams (1 mole) of methyl borate was also placed in the reaction flask. Then 42 grams of $SiCl_4$ (0.25 mole) and 47.5 grams of $TiCl_4$ (0.25 mole) were mixed and placed in the addition funnel. The mixed chlorides were added over a period of 4 minutes to the methyl borate-carbon tetrachloride at room temperature. The temperature in the flask rose about 20° C. and yellow stringy solids formed in the flask. The temperature of the flask and contents was slowly increased and methyl chloride was evolved. The solids in the flask became very gummy and wrapped up into a ball. Later on, as the condensation reaction proceeded, the solids redispersed but never completely dissolved. The reaction was heated to 65–78° C. for a total of about 14 hours. A total of about 1.5 moles of methyl chloride was evolved. When the reaction was completed as evidenced by very little more $CH_3Cl$ being evolved, an additional 300 g. of carbon tetrachloride was added to the flask. The yellow solids did not completely dissolve. However, the liquid phase did contain a dissolved product which left a white gelatinous film wherever the solvent evaporated on the walls of the flask. 87 grams of light tan solid product was recovered by vacuum evaporation of the liquors with heat applied during this process. The solids were infusible, but decomposed when strongly heated. They were slightly soluble in water.

Elemental analysis showed: Si=13.6%; B=11.1%, Cl=4.0%, C=11.0%, H=2.8%, Ti=3.3%, O (by difference)=54.2%.

When glass fabric was dipped into a 1% aqueous solution of this product and dried, marked delustering of the fabric occurred. Good water repellency also developed which was further improved by dipping the fabric in a 1% soap solution, rinsing and drying.

Example 28

In this experiment 0.5 mole (95 g.) titanium tetrachloride was first reacted with 1 mole (104 g.) of methyl borate in 200 g. of methylene chloride. The reaction proceeded rapidly at 26–44° C. About 1 mole of $CH_3Cl$ was evolved indicating that about two of the chlorine atoms in the titanium tetrachloride had reacted with the methyl borate to release $CH_3Cl$. When this reaction was completed, 0.25 mole (42 g.) of $SiCl_4$ was added over a period of about 30 minutes. An immediate reaction occurred and $CH_3Cl$ was evolved. This reaction was continued for about 5 hours and about 0.8 mole of methyl chloride came off. When the $SiCl_4$ was first added to the clear amber solution of the reaction product of $TiCl_4$ and $B(OCH_3)_3$, yellow solids again formed. Most of these dissolved as the reaction progressed. An additional 200 g. of $CH_2Cl_2$ was added to the reaction mixture at the end of the reaction and almost all of the solids dissolved. The methylene chloride was removed from the product by vacuum evaporation. There was recovered about 157 grams of yellow solids which rapidly dissolved in water with effervescence and evolution of heat. The yellow solids softened and became rubbery over a temperature range of about 70–100° C. As the temperature is raised over 100° C., volatile materials are evolved, the solids turn white and become much less soluble in water.

Elemental analysis of the product from this reaction showed: Ti=15.6%, Si=3.3%, Cl=27.5%, B=8.2%, C=7.2%, H=2.7%, O (by difference)=25.5%.

A 1% aqueous solution of this product was applied to glass fabric and dried. A marked delustering occurred. Then the fabric was washed in a 1% soap solution. Excellent water repellency developed.

One gram of the complex product of this example was suspended in 50 ml. of dry toluene. To this mixture was added 3 ml. of a solution containing 25% of triethyl aluminum. The finely divided solids were reduced instantly to give a purple-black suspension-solution. 10 ml. of this solution-suspension were added to 150 ml. of dry hexane. Ethylene was added to the bottle via a hypodermic needle. Excess ethylene was vented through a similar needle. Polymerization started instantly and crystalline polyethylene was formed at room temperature and atmospheric pressure.

Example 29

Sixty-seven grams (0.5 mole) of dry, ground $AlCl_3$ was suspended in 400 g. of dry $CH_2Cl_2$ in a 1-liter flask. To this was added 104 grams (1 mole) of methyl borate over a period of about 25 minutes. The reaction mixture was heated for about 3 hours. About 0.75 mole of methyl chloride was evolved. Then 84 grams of $SiCl_4$ was added to the flask with stirring over a period of about 30 minutes. The reaction mixture was heated to 40–42° C. for about 28 hours. Another 0.75 mole of methyl chloride was evolved. The product was a white finely divided solid which was isolated by filtering from the methylene chloride and drying at about 75° C. in a vacuum oven. Total recovery was about 115 g. of white solids.

A 1% aqueous solution of this product was very substantive to glass fabric. A dip of the fabric in 1% solution followed by a squeeze through rolls to give about 100% wet pick up, then ironed dry gave a fabric which was permanently stiffened in a way that starch stiffens cotton fabrics. This stiffening resisted washing out even in soap solutions. When rinsed in a soap solution, outstanding water repellency developed.

Example 30

About 0.5 gram of the dry reaction product of $TiCl_4$ and $B(OCH_3)_3$, as prepared in Example 1, was suspended and dissolved in 20 ml. of dry toluene. To this was added, under anaerobic conditions, about 3 ml. of a 25% solution of $Al(C_2H_5)_3$ in hexane. A rapid reaction took place and the color of the solution changed to a deep purple-black. 10 ml. of this solution was added to 150 ml. of dry hexane in a 250 ml. bottle fitted with a septum cap, a hypodermic needle to admit ethylene and a similar needle to vent excess ethylene. Ethylene was admitted and was rapidly polymerized to give crystalline, polyethylene resin.

Example 31

The reaction product of $TiCl_4$ and $AlCl_3$ with methyl borate as described in example 16 was used in this experiment. 1 gram of this product was added to 150 ml. of dry hexane in a 250 ml. bottle stoppered with a rubber septum cap. It appeared to be completely insoluble. Stirring was accomplished by a magnetic stirring bar. Then 5 ml. of 25% $Al(C_2H_5)_3$ in hexane was injected into the suspension by means of a hypodermic syringe. No apparent reduction occurred over a 30-minute period at room temperature. Then ethylene was added through a hypodermic needle. Excess was vented through a similar needle. After about 10 minutes, some polyethylene was observed forming around the solids. The color of the solution gradually became an orange-red color as more polyethylene formed. After about 2 hours, about 0.5 g. of crystalline polyethylene was recovered.

Example 32

95 g. of $TiCl_4$ (0.5 mole) was reacted with 52 g. (0.5 mole) of methyl borate in methylene chloride. About 0.5 mole of methyl chloride was evolved. Then 0.5 mole of a $C_{12}$–$C_{14}$ primary amine was added and reacted. When the reaction was completed, the methylene chloride was removed by vacuum evaporation. There remained 227 g. of light brown waxy solids.

One gram of this product was dissolved in 50 ml. dry toluene. Solution was complete. 20 ml. of this solution was transferred to a 250 ml. bottle containing 150 ml. dry hexane. Then a 4 ml. of a 25% solution of $Al(C_2H_5)_3$ was injected into this solution. An immediate reaction took place and the solution turned deep purple-black color. Then ethylene was added to the bottle through a hypodermic needle at atmospheric pressure and room temperature. Polymerization took place instantly and was continued for about 2.5 hours. There was finally recovered about 5 g. of finely divided crystalline polyethylene.

In my copending application Ser. No. 670,450 and filed Sept. 25, 1967, I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a chloride of a metal selected from the group consisting of Al(III) and Fe(III) together with the complex compounds formed thereby.

In my copending application Ser. No. 670,449, filed Sept. 25, 1967, I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a chloride of a metal selected from the group consisting of Mo(V), Nb(V), Ta(V), and W(VI) together with the complex compounds formed thereby.

In my copending application Ser. No. 670,418, filed Sept. 25, 1967, I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a mixture of at least two chlorides of metals selected from the group consisting of Ti(IV), Zr(IV), Hf(IV), Sn(IV), Al(III), Fe(III), Mo(V), Nb(V), Ta(V), and W(VI) together with the complex compounds formed thereby.

In my copending application Ser. No. 670,417, filed Sept. 25, 1967, I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a chloride of a first metal selected from the group consisting of Ti(IV), Zr(IV), Hf(IV), Sn(IV), Al(III), Fe(III), Mo(V), Nb(V), Ta(V), and W(VI) in an inert diluent to form a liquor comprising the diluent and a first compound of complex chemical structure and then adding to the liquor the chloride of a second metal selected from said group and permitting it to react with said compound of complex chemical structure to form a second compound of complex chemical structure comprising both of the selected metals, boron, carbon, hydrogen, chlorine, and oxygen.

I claim:
1. The method which comprises mixing at least one substantially anhydrous borate ester selected from the group consisting of trimethyl borate, triethyl borate, tripropyl borate, tributyl borate, trihexyl borate, trihexylene glycol biborate, and tri(m,p)cresyl borate with a substantially anhydrous chloride of a metal selected from the group consisting of Ti(IV), Zr(IV), Hf(IV) and Sn(IV), in a molar ratio of at least about 0.33 mole of the selected borate for each mole of the chloride of the selected metal in an inert substantially anhydrous diluent, permitting the chloride of the selected metal to react with the selected borate at a temperature between room temperature and about 200° C. until the reaction mixture ceases to give off organic chloride thereby forming a liquor comprising said diluent and a compound of complex chemical structure comprising the selected metal, boron, carbon, hydrogen, chlorine, and oxygen.

2. The method as claimed by claim 1 wherein said diluent is selected from the group consisting of the selected borate ester, methylene chloride, chloroform, and carbon tetrachloride.

3. A compound of complex chemical structure produced by the method as claimed by claim 1.

4. The method which comprises mixing substantially anhydrous trimethyl borate with a substantially anhydrous chloride of a metal selected from the group consisting of Ti(IV), Zr(IV), Hf(IV) and Sn(IV) in a molar ratio of at least about 0.33 mole of said borate for each mole of the chloride of the selected metal in an inert substantially anhydrous diluent, permitting the chloride of the selected metal to react with said borate at a temperature between room temperature and about 120° C. until the reaction mixture ceases to give off methyl chloride thereby forming a liquor comprising said diluent and a compound of complex chemical structure comprising the selected metal, boron, carbon, hydrogen, chlorine, and oxygen.

5. The method as claimed by claim 4 wherein said diluent is selected from the group consisting of said borate, methylene chloride, chloroform, and carbon tetrachloride.

6. A compound of complex chemical structure produced by the method claimed by claim 4.

7. The method as claimed by claim 4 wherein the chloride of the selected metal is titanium tetrachloride.

8. The method as claimed by claim 4 wherein the chloride of the selected metal is zirconium tetrachloride.

9. The method as claimed by claim 4 wherein the chloride of the selected metal is hafnium tetrachloride.

10. The method as claimed by claim 4 wherein the chloride of the selected metal is tin tetrachloride.

11. A compound of complex chemical structure produced by the method as claimed by claim 7.

12. A compound of complex chemical structure produced by the method as claimed by claim 8.

13. A compound of complex chemical structure produced by the method as claimed by claim 9.

14. A compound of complex chemical structure produced by the method as claimed by claim 10.

15. A solution of the compound claimed by claim 11 in a solvent selected from the group consisting of water, methylene chloride, chloroform, carbon tetrachloride, acetone, and glycol ethers.

References Cited

UNITED STATES PATENTS

| | | | |
|---|---|---|---|
| 2,312,208 | 2/1943 | Clayton et al. | 260—429 XR |
| 2,346,155 | 4/1944 | Denison et al. | 260—429 XR |
| 2,440,750 | 5/1948 | Kraus et al. | 260—429.3 XR |
| 2,491,116 | 12/1949 | Kraus et al. | 260—429.3 XR |
| 2,541,851 | 2/1951 | Wright. | |
| 2,597,920 | 5/1952 | Carroll | 260—429.5 XR |
| 2,941,981 | 6/1960 | Elbling et al. | 260—429.5 XR |
| 3,296,242 | 1/1967 | Turner et al. | 260—429.3 XR |

OTHER REFERENCES

Chemical Abstracts, vol. 32, p. 2511 (1938).
Chemical Abstracts, vol. 54, p. 14100 (1960).
Zhur. Obshch. Khim, vol. 27, pp. 1476–79 (1957).
Chainani et al.: J. Chem. Soc., pp. 3168–70 (1960).
Steinberg: Organoboron Chemistry, Untersc. Publ., John Wiley & Sons Inc., New York (1964), vol. 1, pp. 144–46, 530.

TOBIAS E. LEVOW, Primary Examiner

H. M. S. SNEED, Assistant Examiner

U.S. Cl. X.R.

260—45.75, 91.5, 93.5, 93.7, 94.9, 429, 429.5, 429.7, 438.1, 439, 448, 448.2, 999; 106—215; 117—62.1, 72, 124, 135.5, 138.8, 144.5; 252—8.6, 301.2, 431